United States Patent [19]

Okuda et al.

[11] Patent Number: 5,559,896
[45] Date of Patent: Sep. 24, 1996

[54] METHOD AND APPARATUS FOR RECOGNIZING MEANDERING OF WEB

[75] Inventors: Tetsuya Okuda; Shinichi Kojima, both of Ibaraki, Japan

[73] Assignee: Komori Corporation, Japan

[21] Appl. No.: 506,434

[22] Filed: Jul. 24, 1995

Related U.S. Application Data

[63] Continuation of Ser. No. 289,995, Aug. 12, 1994, abandoned, which is a continuation of Ser. No. 944,519, Sep. 14, 1992, abandoned.

[30] Foreign Application Priority Data

Sep. 19, 1991  [JP]  Japan .................................. 3-266984

[51] Int. Cl.$^6$ ...................................... G06K 9/00
[52] U.S. Cl. ................................................ 382/141
[58] Field of Search ................................. 382/100, 209, 382/218, 282; 355/72; 356/394; 358/101, 106, 107; 226/91

[56] References Cited

U.S. PATENT DOCUMENTS

| | | | |
|---|---|---|---|
| 4,468,706 | 8/1984 | Cahill | 358/300 |
| 4,566,042 | 1/1986 | Cahill | 358/300 |
| 5,058,175 | 10/1991 | Aso | 356/394 |
| 5,255,331 | 10/1993 | Kelly | 382/48 |

FOREIGN PATENT DOCUMENTS

| | | | |
|---|---|---|---|
| 0075270 | 9/1982 | European Pat. Off. | B41F 33/00 |
| 0104477 | 8/1983 | European Pat. Off. | G06F 15/20 |
| 0443062 | 2/1990 | European Pat. Off. | B41F 33/00 |
| 163879 | 6/1990 | Japan | G06F 15/62 |
| 2159622 | 7/1982 | United Kingdom | G01N 21/86 |

*Primary Examiner*—Jose L. Couso
*Attorney, Agent, or Firm*—Blakely, Sokoloff, Taylor & Zafman

[57] ABSTRACT

According to a method and apparatus for recognizing meandering of a web, all pixel addresses and all pixel data of a printed matter serving as a reference are received and it is determined whether each pixel represents a region in which an abrupt change in density occurs as an edge. The pixel address and pixel data of each pixel determined as an edge are stored as the reference image data. A difference value between pixel data of test image data obtained from the web on which a test object is printed and pixel data of the reference data at the pixel addresses of the reference data and the corresponding pixel addresses of the test image data in a one-to-one correspondence is calculated. A meandering state of the web is recognized on the basis of each difference value.

17 Claims, 2 Drawing Sheets

METHOD AND APPARATUS FOR RECOGNIZING MEANDERING OF WEB

This is a continuation of U.S. patent application Ser. No. 08/289,995 filed Aug. 12, 1994, now abandoned, which is a continuation of U.S. patent application Ser. No. 07/944,519 filed on Sep. 14, 1992, abandoned.

BACKGROUND OF THE INVENTION

The present invention relates to a method and apparatus for recognizing meandering of a web, which are suitable for detection of a defective printed matter in a printing press, by comparing prestored reference image data with test image data obtained from a web on which a test object is printed.

In recent years, each pixel data (density data) of a printed matter serving as a reference is read and stored as reference image data by using an image processing means having an optical image pickup system, and then each pixel data of a test object is read as test image data by using the same image processing means as described above. The stored reference image data is compared with the test image data to automatically detect a defective printed matter.

The defective printed matter detecting apparatus for a printing press includes an image pickup means such as a CCD camera or a line sensor, a signal processor for processing an electrical signal as an output signal from the image pickup means, and a reference signal generating means for supplying a reference signal for processing to the signal processor. The level of pixel data (pixel position data) of the reference image data is compared with the level of the corresponding pixel data of the test image data to determine whether a difference between the levels of the reference and test image data falls within a predetermined range, thereby determining the defective or nondefective printed matter.

The printed matter serving as a reference for extracting the reference image data is a printed matter which is visually determined as a satisfactory printed matter selected from actual printed matters obtained in test printing at the start of printing.

According to the conventional defective printed matter detecting apparatus, when a rotary press is assumed, the corresponding pixel positions of the reference and test image data are slightly shifted from each other by meandering of a web on which the test object is printed, and this shift is determined as a defect.

More specifically, in the rotary press, the web slowly meanders during printing due to a slight difference in tension or the like. For this reason, although the corresponding pixel positions of the reference and test image data are slightly shifted from each other, the printed matter can be circulated as a satisfactory product unless this shift is large.

In the conventional defective printed matter detecting apparatus, since the reference image data at the start of printing is permanently used, the level difference between the reference and test image data is gradually increased with meandering. The resultant printed matter is determined as a defective printed matter although it can be circulated as a satisfactory product.

SUMMARY OF THE INVENTION

It is an object of the present invention to provide a method and apparatus for recognizing meandering of a web so as to accurately recognize meandering of the web.

It is another object of the present invention to provide a method and apparatus for recognizing meandering of a web so as to prevent a printed matter from being determined as a defective printed matter by meandering of the web.

In order to achieve the above objects according to an aspect of the present invention, there is provided a method of recognizing meandering of a web, comprising the steps of receiving all pixel addresses and all pixel data of a printed matter serving as a reference and determining whether each pixel represents a region in which an abrupt change in density occurs as an edge, storing, as reference data, the pixel address and pixel data of each pixel determined as an edge, calculating a difference value between pixel data of test image data obtained from the web on which a test object is printed and pixel data of the reference data at the pixel addresses of the reference data and the corresponding pixel addresses of the test image data in a one-to-one correspondence, and recognizing a meandering state of the web on the basis of each difference value.

In order to achieve the above objects according to another aspect of the present invention, there is provided an apparatus for recognizing meandering of a web, comprising edge determining means for receiving all pixel addresses and all pixel data of a printed matter serving as a reference and determining whether each pixel represents a region in which an abrupt change in density occurs as an edge, reference data storing means for storing, as reference data, the pixel address and pixel data of each pixel determined as an edge by the edge determining means, difference value calculating means for calculating a difference value between pixel data of test image data obtained from the web on which a test object is printed and pixel data of the reference data at the pixel addresses of the reference data stored in the reference data memory means and the corresponding pixel addresses of the test image data in a one-to-one correspondence, and meandering recognizing means for recognizing a meandering state of the web on the basis of each difference value calculated by the difference value calculating means.

DESCRIPTION OF THE PREFERRED EMBODIMENT

A preferred embodiment of the present invention will be described with reference to the accompanying drawings.

Figure 1:
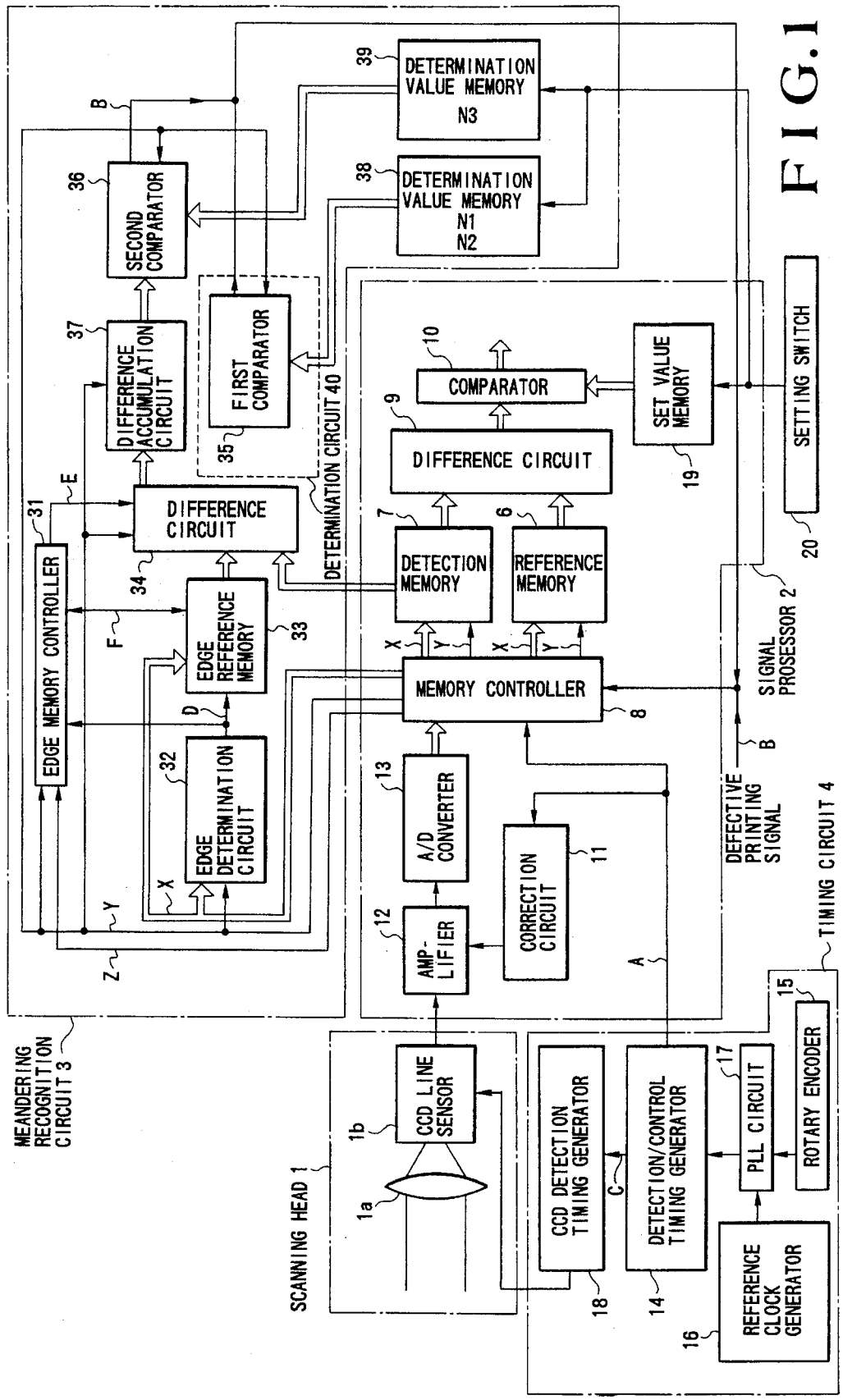
FIG. 1 is a block diagram of a defective printed matter detecting apparatus for a printing press, which has a web meandering recognition unit according to an embodiment of the present invention.

FIG. 1 shows a defective printed matter detecting apparatus for a printing press, which has a web meandering recognition unit according to an embodiment of the present invention. A scanning head 1 serving as an image pickup means comprises an optical system such as a lens 1a and a CCD line sensor 1b for converting an image focused through the optical system into an electrical signal. The scanning head 1 can pick up the resultant printed matter as an image.

A signal processor 2 comprises a reference memory 6 for storing input reference image data, a detection memory 7 for storing input test image data, a memory controller 8 for controlling read access and write access of the reference memory 6 and the detection memory 7, a difference circuit 9 for calculating a difference between pixel data read out from the reference memory 6 and the detection memory 7, a comparator 10 for comparing an output from the difference circuit 9 with a set value, a correction circuit 11, an amplifier 12 for amplifying an output from the CCD line sensor 1b in the scanning head 1, an A/D converter 13 for receiving an output from the amplifier 12 and outputting digital data to the memory controller 8 upon A/D conversion, and a set value memory 19 for outputting a value set by a setting switch 20 to the comparator 10. Reference symbol X denotes pixel data; and Y, a step signal such as a pixel address.

The signal processor 2 is controlled by an external control timing signal A and a reference value memory signal B. More specifically, the control timing signal A comprises a reference signal as a pulse signal rising every rotation of a plate cylinder in a printing press (not shown) and a clock pulse as a read/write pulse signal rising every rotation of the plate cylinder. The control timing signal A is output from a detection/control timing generator 14 and is supplied to the memory controller 8 and the correction circuit 11 in the signal processor 2. On the other hand, the reference value memory signal B is supplied upon a turn-on operation of a switch (not shown) or supplied from a meandering recognition circuit 3 (to be described below) to the memory controller 8 in the signal processor 2.

The detection/control timing generator 14 comprises an up/down counter. The intervals of a detection timing signal C and the control timing signal A as output signals from the detection/control timing generator 14 are changed in accordance with a printing press speed detected by a rotary encoder 15 serving as a rotation detecting means. A PLL circuit 17 compares a reference clock pulse output from a reference clock generator 16 with the pulse signal representing the speed output from the rotary encoder 15 to control the detection/control timing generator 14 so as to output the detection timing signal C and the control timing signal A, both of which correspond to the printing press speed. Reference numeral 18 denotes a CCD detection timing generator for controlling the CCD line sensor 1b every rotation of the plate cylinder upon reception of the detection timing signal C so as to cause the signal processor 2 to receive a video signal. The detection/control timing generator 14, the rotary encoder 15, the reference clock generator 16, the PLL circuit 17, and the CCD detection timing generator 18 constitutes a timing circuit 4.

In this embodiment, read access of the video signal from the CCD line sensor 1b and signal processing timings in the signal processor 2 are changed so as to follow the printing press speed (rotational speed of the plate cylinder) detected by the rotary encoder 15.

On the other hand, the meandering recognition circuit 3 comprises an edge memory controller 31, an edge determination circuit 32 for receiving the output data X from the memory controller 8, an edge reference memory 33 for receiving the output data from the memory controller 8 and a determination output from the edge determination circuit 32, a difference circuit 34 for receiving output data from the edge reference memory 33 and output data from the detection memory 7, a determination circuit 40 having a first comparator 35 for comparing output data from the difference circuit 34 with a predetermined determination value, a difference accumulation circuit 37 for receiving the output data from the difference circuit 34, a second comparator 36 for comparing an output from the difference accumulation circuit 37 with a predetermined determination value, a first determination value memory 38 for outputting determination value data set by the setting switch 20 to the first comparator 35, and a second determination value memory 39 for outputting determination value data set by the setting switch 20 to the second comparator 36.

The edge memory controller 31, the edge determination circuit 32, the difference circuit 34, the first comparator 35, the second comparator 36, and the difference accumulation circuit 37 receive the step signal Y such as a pixel address from the memory controller 8. The edge memory controller 31 also receives a reference value data fetch enable signal Z. The edge determination circuit 32 outputs a determination signal D to the edge controller 31 and the edge reference memory 33. The edge memory controller 31 exchanges a predetermined pixel address F with the edge reference memory 33, and outputs a difference signal operation signal E to the difference circuit 34. Reference value memory signals B are output from the first and second comparators 35 and 36 in the meandering recognition circuit 3 to switch the above-mentioned reference image signal. The reference value memory signal B output from the comparator 35 has a function slightly different from that from the comparator 36. The difference in function will be described in detail later.

An operation of the defective printed matter detecting apparatus having the above arrangement will be described below.

At the start of printing, states of actual printed matters are visually checked while test printing is being performed. If the printed matters are determined to be satisfactory, a switch (not shown) is turned on to output the reference value memory signal B. Thereafter, when the detection timing signal C and the control timing signal A which represent a reference position are output from the detection/control timing generator 14, the CCD line sensor 1b is driven in accordance with an output from the CCD detection timing generator 18, thereby performing read access of the reference memory 6 for the reference image data from the printed matter serving as the reference. This read access is performed in accordance with the control timing signal A output from the detection/control timing generator 14 controlled by a clock pulse from the rotary encoder 15.

The reference image data read from the CCD line sensor 1b is stored in the reference memory 6 through the amplifier 12, the A/D converter 13, and the memory controller 8. After the reference image data is stored in the reference memory 6, test image data of the printed matter serving as a detection object is read during rotation of the plate cylinder upon progress of the printed matter. The read test image data is stored in the detection memory 7 selected by the memory controller 8.

The difference circuit 9 calculates a level difference between the corresponding pixel data of the reference image data output from the reference memory 6 and the test image data output from the detection memory 7. Data representing the level difference is output to the comparator 10. The comparator 10 compares the level difference input from the difference circuit 9 with a predetermined value stored in the set value memory 19. If the level difference is larger than the predetermined value, the comparator 10 outputs a comparison output representing a defective printed matter. In this case, if even one pixel having a level difference larger than the predetermined value is present, the defective printed matter may be determined. Alternatively, if a predetermined number of pixels having level differences each larger than the predetermined value are present, the defective printed matter may be determined.

A web meandering recognizing operation (additional function) performed simultaneously with the defective printed matter detecting operation (basic function) will be described with reference to the operation of the meandering recognition circuit 3.

The edge determination circuit 32 receives the step signal Y and the pixel density data X (representing 256 gray scale levels 0 to 255) from the memory controller 8. That is, the edge determination circuit 32 receives pixel addresses and pixel data of a printed matter subjected to detection. The edge determination circuit 32 adds differences between target pixels and weighted neighboring pixels, thereby determining a region (i.e., an edge) in which an abrupt change in density occurs. A technique for performing edge determination upon detection of this region is disclosed in Japanese Patent Laid-Open No. 2-163879 issued to the present applicant, and a detailed description thereof will be omitted.

Figure 2:
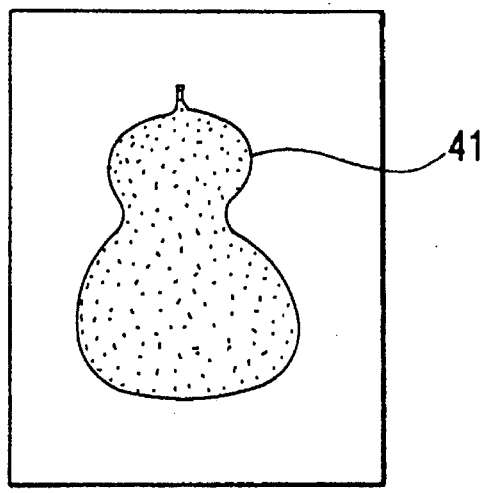
FIG. 2 is a view showing an image pattern on a printed matter serving as a reference.
Figure 3:
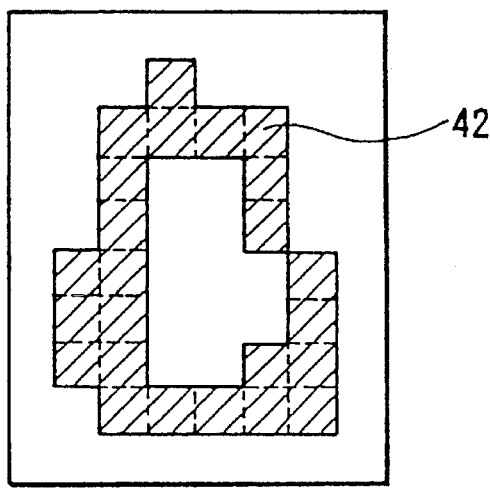
FIG. 3 is a view showing a determination state of edge pixels for this image pattern.

FIG. 2 is a view showing an image pattern 41 on a printed matter serving as a reference. The edge determination circuit 32 receives pixel addresses and pixel data of this image pattern 41 and determines pixels represented by a hatched portion 42 (FIG. 3) as edge pixels.

The edge determination circuit 32 supplies the edge determination signal D representing the determined edge pixels to the edge reference memory 33 and the edge memory controller 31. Upon reception of the reference value data fetch enable signal Z from the memory controller 8, the edge memory controller 31 stores the pixel addresses and data of the edge pixels in the edge reference memory 33.

When the above-mentioned switch (not shown) is turned on to supply the reference value memory signal B from the memory controller 8, the edge memory controller 31 receives the reference value data fetch enable signal Z from the memory controller 8. Upon reception of this reference value data fetch enable signal Z, when the memory controller 31 receives the edge determination signal D from the edge determination circuit 32, the edge memory controller 31 sequentially stores the pixel addresses F and the pixel data X of the edge pixels as reference data in the edge reference memory 33.

Storage of the reference data in the edge reference memory 33 is thus completed.

Figure 4:
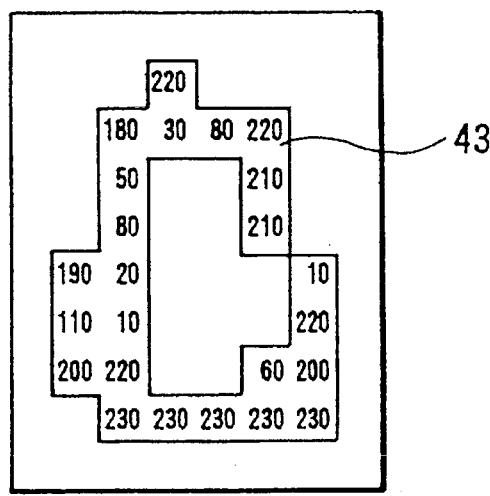
FIG. 4 is a view showing the concept of reference data stored in correspondence with this image pattern.

FIG. 4 conceptually shows reference data 43 stored in the edge reference memory 33 in correspondence with the image pattern shown in FIG. 2.

On the other hand, the difference circuit 34 receives test image data from the detection memory 7. This test image data are data of all pixels regardless of edge or non-edge pixels. The edge memory controller 31 receives the pixel addresses F of the edge pixels from the edge reference memory 33 and pixel addresses (step signals) Y of the test image data from the memory controller 8. The edge memory controller 31 enables the difference circuit 34 only when the pixel address of the test image data corresponds to that of the edge pixel. At the same time, the edge memory controller 31 sends the corresponding pixel data from the edge reference memory 33 to the difference circuit 34. That is, when the pixel address of the test image data does not represent an edge pixel, the difference circuit 34 is kept disabled, and the corresponding pixel data is not sent from the edge reference memory 33 to the difference circuit 34.

When the difference circuit 34 is enabled by the edge memory controller 31, the difference circuit 34 calculates difference values between the pixel data (reference pixel data) of the edge pixels sent from the reference memory 33 and the pixel data (test pixel data) of the pixel addresses corresponding to the test image data. That is, the difference circuit 34 calculates the difference values (differences between the reference pixel data and the test pixel data) of only the test data of the test image data corresponding to the reference data.

The difference values of all edge pixels which are obtained by the difference circuit 34 are supplied to and simultaneously processed in the determination circuit 40 and the difference accumulation circuit 37.

Each difference value supplied to the first comparator 35 in the determination circuit 40 is compared with a first determination value N1 stored in the determination value memory 38. In this case, the number of edge pixels each having a difference exceeding this determination value N1 is compared with a second determination value N2. When the number of pixels each exceeding the determination value N1 exceeds the determination value N2, the determination circuit 40 outputs the reference value memory signal B. That is, when the number of pixels each exceeding the predetermined value N1, i.e., a predetermined edge error, exceeds the predetermined value N2, a meandering state of the web is recognized, and the reference value memory signal B is output. Comparison with the determination value N2 and output of the reference value memory signal B are performed in the determination circuit 40. This reference value memory signal B is supplied to the memory controller 8 in the same manner as in the case wherein the switch (not shown) is turned on to supply this signal. Therefore, the memory controller 8 can update and store the next test image data as the reference image data in the reference memory 6.

In response to the reference value memory signal B output from the determination circuit 40, the reference value data fetch enable signal Z is not supplied from the memory controller 8 to the edge memory controller 31. When comparison between the differences of edge pixels of one frame is completed, the total number of pixels having differences exceeding the determination value N1 is returned to zero upon reception of a step signal Y representing the end pixel address.

Table 1 shows the reference pixel data, the test pixel data, the difference data, and the total number of pixels (the number of NG pixels) exceeding the determination value N1 when the determination value N1 is given as N1=±20 and the determination value N2 is given as N2=3. In this case, the reference value 40 memory signal B is output from the determination circuit at an edge pixel satisfying the condition that the number of NG pixels is 4.

TABLE 1

| Edge Pixel | Reference Pixel Data | Test Pixel Data | Difference | Total Number of NG Pixels |
|---|---|---|---|---|
| First | 100 | 110 | −10 | 0 |
| Second | 150 | 100 | 50 | NG 1 |
| Third | 50 | 60 | −10 | 1 |
| Fourth | 200 | 170 | 30 | NG 2 |
| Fifth | 26 | 20 | 6 | 2 |
| Sixth | 80 | 130 | −50 | NG 3 |
| . | . | . | . | . |
| . | . | . | . | . |
| . | . | . | . | . |
| Last | — | — | — | — |

The absolute values of the differences of all edge pixels of one frame, represented by the difference data supplied to the difference accumulation circuit 37, are accumulated and averaged to obtain a difference average value. That is, the difference average is obtained by the following formula (1):

(Total Sum of Absolute Values of Differences   (1)
between Reference Pixel Data and Test Pixel Data)/
(Number of Edge Pixels)

This difference average value data is supplied to the second comparator 36 and is compared with a determination value N3 stored in the determination value memory 39. If the difference average value exceeds the determination value N3, the reference value memory signal B is output from the second comparator 36. When the average value of the edge errors of all edge pixels exceeds the predetermined value N3, the meandering state of the web is recognized, and the reference value memory signal B is output. This reference value memory signal B is supplied to the memory controller 8 in the same manner as in the case wherein the switch (not shown) is turned on to supply this signal. Therefore, the memory controller 8 can update and store the next test image data as the reference image data in the reference memory 6.

The reference value memory signal B sent from the second comparator 36 is slightly different from that from the first comparator 35. Upon reception of the reference value memory signal B from the second comparator 36, the memory controller 8 supplies the reference value data fetch enable signal Z to the edge memory controller 31. Therefore, when the reference value memory signal B is output from the second comparator 36, both the reference image data in the reference memory 6 and the reference data in the edge reference memory 33 are updated. When comparison of the difference average values within one frame is completed, the total absolute value of the differences is returned to zero upon reception of the step signal Y representing the end pixel address.

Table 2 shows the reference pixel data, the test pixel data, the absolute values of the differences, and the total value of the absolute values of the differences when the determination value N3 is given as N3=5. When the last edge pixel is given as the 100th edge pixel, the difference average becomes 235/100= 2.35. In this case, the average does not exceed the determination value N3, the reference value memory signal B is not output from the second comparator 36.

TABLE 2

| Edge Pixel | Reference Pixel Data | Test Pixel Data | Absolute Value | Total Absolute Value |
|---|---|---|---|---|
| First | 100 | 98 | 2 | 2 |
| Second | 200 | 222 | 22 | 24 |
| Third | 150 | 156 | 6 | 30 |
| Fourth | 165 | 162 | 3 | 33 |
| Fifth | 32 | 53 | 21 | 54 |
| Sixth | 75 | 75 | 0 | 54 |
| . | . | . | . | . |
| . | . | . | . | . |
| . | . | . | . | . |
| Last | 37 | 36 | 1 | 235 |

As is apparent from the above description, according to the present invention, difference values between the pixel data at corresponding pixel addresses of the test and reference data are calculated. When the number of difference values exceeding a predetermined value is a predetermined number or more, i.e., when the number of edge pixels exceeding the predetermined value is a predetermined number or more, the meandering state of a web is recognized. Differences between pixel data at corresponding pixel addresses of the test and reference data are calculated, and the absolute values of the differences are accumulated and averaged to obtain a difference average. When the difference average exceeds a predetermined value, i.e., when the average of the edge errors in all the edge pixels exceeds a predetermined value, the meandering state of the web is recognized. The reference image data can be automatically input again on the basis of the above recognition results, and a printed matter is not determined as a defective printed matter by slight meandering of the web.

What is claimed is:

1. A computer implemented method of recognizing meandering of a web, comprising the steps of:

receiving signals that represent all pixel addresses and all pixel data of printed matter serving as a reference and determining whether each pixel represents an edge region in which an abrupt change in density occurs as an edge;

storing, as reference data, the signals that represent the pixel address and pixel data only of each pixel determined to represent the edge region in which the abrupt change in density occurs as an edge;

calculating a difference value signal between the signals that represent the pixel data of test image data obtained from the web on which a test object is printed and the signals that represent the pixel data of the reference data in accordance with the pixel addresses of the reference data in the edge region;

comparing the difference value signal with a first predetermined value signal to count the number of edge pixels having difference value signals exceeding the first predetermined value signal in the edge region;

recognizing the meandering state of the web when a total number of edge pixels having difference value signals exceeding the first predetermined value signal is not less than a predetermined number; and generating a meandering notification signal when the meandering state of the web is recognized.

2. A method according to claim 1, further comprising the step of clearing the total number of edge pixels to zero at an end of printing of the test object on the web.

3. A method according to claim 1, further comprising the step of updating and storing reference data for detecting a defective printed matter when the meandering state of the web is recognized.

4. A method according to claim 1, further comprising the steps of:

accumulating absolute values of all difference values and averaging the absolute values to obtain a difference value in the edge region; and recognizing the meandering state of the web when the difference value exceeds a second predetermined value.

5. A computer implemented method of recognizing meandering of a web, comprising the steps of:

receiving signals that represent all pixel addresses and all pixel data of printed matter serving as a reference and determining whether each pixel represents an edge region in which an abrupt change in density occurs as an edge;

storing, as reference data, the signals that represent the pixel address and pixel data only to each pixel determined to represent the edge region in which the abrupt change in density occurs as an edge;

calculating a difference value signal between the signals that represent the pixel data of test image data obtained from the web on which a test object is printed and the signals that represent the pixel data of the reference data in accordance with the pixel addresses of the reference data in the edge region;

accumulating absolute value signals of all the difference value signals and averaging the absolute value signals to obtain a difference average value signal in the edge region;

recognizing the meandering state of the web when the difference average value signals exceeds a predetermined value; and generating a meandering notification signal when the meandering state of the web is recognized.

6. A method according to claim 5, further comprising the step of storing and updating, as reference data, the pixel address and pixel data only of each pixel determined to represent the edge region in which the abrupt change in density occurs as an edge when the meandering state of the web is recognized.

7. A method according to claim 5, further comprising the step of clearing the total number of absolute values of the difference values to zero at an end of printing of a test object on the web.

8. A method according to claim 5, further comprising the step of updating and storing the reference data for detecting a defective printed matter when the meandering state of the web is recognized.

9. An apparatus for recognizing meandering of a web, comprising:

edge determining means for receiving all pixel addresses and all pixel data of a printed matter serving as a reference and determining whether each pixel represents a region in which an abrupt change in density occurs as an edge;

reference data storing means for storing, as reference data, the pixel address and pixel data only of each pixel determined to represent the edge region in which the abrupt change in density occurs as an edge by said edge determining means;

difference calculating means for calculating a difference value between pixel data of test image data obtained from the web on which a test object is printed and pixel data of the reference data at the pixel addresses of the reference data stored in said reference data memory means and the corresponding pixel addresses of the test image data in a one-to-one correspondence; and meandering recognizing means for recognizing a meandering state of the web on the basis of each difference value calculated by said difference value calculating means, wherein said meandering recognizing means comprises first comparing means for comparing the difference value exceeds a predetermined value, and determining means for recognizing the meandering state of the web when a total number of edge pixels having difference values exceeding the predetermined value is not less than a predetermined number.

10. An apparatus according to claim 9, wherein said meandering recognizing means is further comprised of a difference average calculating means for accumulating absolute values of the difference values and averaging the absolute values to obtain a difference average value, and a second comparing means for recognizing the meandering state of the web when the difference average value exceeds a predetermined value.

11. An apparatus according to claim 9, further comprising reference data updating means for updating and storing reference data for detecting a defective printed matter when the meandering state of the web is recognized.

12. An apparatus for recognizing meandering of a web, comprising:

edge determining means for receiving all pixel addresses and all pixel data of a printed matter serving as a reference and determining whether each pixel represents a region in which an abrupt change in density occurs as an edge;

reference data storing means for storing, as reference data, the pixel address and pixel data only of each pixel determined to represent the edge region in which the abrupt change in density occurs as an edge by said edge determining means;

difference calculating means for calculating a difference value between pixel data of test image data obtained from the web on which a test object is printed and pixel data of the reference data at the pixel addresses of the reference data stored in said reference data memory means and the corresponding pixel addresses of the test image data in a one-to-one correspondence; and meandering recognizing means for recognizing a meandering state of the web on the basis of each difference value calculated by said difference value calculating means, wherein said meandering recognizing means further comprises a difference average calculating means for accumulating absolute values of the difference values and averaging the absolute values to obtain a difference average value, and second comparing means for recognizing the meandering state of the web when the difference average value exceeds a predetermined value.

13. An apparatus according to claim 9, wherein the total number of edge pixels is cleared to zero at an end of printing of the test object on the web.

14. An apparatus according to claim 12, further comprising an edge memory controller for storing and updating the reference data representing the edge when the meandering state of the web is recognized.

15. An apparatus according to claim 12, wherein the total number of absolute values of the difference values is cleared to zero at an end of printing of a test object on the web.

16. An apparatus according to claim 12, further comprising reference data updating means for updating and storing reference data for detecting a defective printed matter when the meandering state of the web is recognized.

17. A defective printed matter detecting apparatus comprising:

reference data storing means for storing, as reference pixel data, all pixel data of a printed matter serving as a reference;

defective printed matter detecting means for comparing all pixel data of the test image data of a web on which a test object is printed with all pixel data of reference image data stored in said reference data storing means in accordance with pixel addresses of the test image data and the reference image data to detect the defective printed matter;

edge determining means for receiving all pixel addresses and all pixel data of the printed matter serving as the reference and determining whether each pixel represents an edge region in which an abrupt change in density occurs as an edge;

edge data storing means for storing, as reference data, the pixel address and pixel data only of each pixel determined to represent the edge region in which the change in density occurs as an edge by said edge determining means;

difference value calculating means for calculating a difference value between pixel data of the test image data obtained from the web on which a test object is printed and the pixel data of the reference data stored in said edge data storing means in accordance with the pixel addresses of the reference data stored in said edge data storing means;

parameter calculating means for calculating a parameter on the basis of each difference value calculated by said difference calculating means;

meandering recognizing means for determining whether the parameter calculated by said parameter calculating means exceeds a predetermined value to recognize a meandering state of the web; and a reference data control means for updating and storing data of said reference data storing means when the meandering state of the web is recognized by said meandering recognizing means.

* * * * *

UNITED STATES PATENT AND TRADEMARK OFFICE
CERTIFICATE OF CORRECTION

PATENT NO. : 5,559,896
DATED : September 24, 1996
INVENTOR(S) : Okuda et al.

It is certified that error appears in the above-identified patent and that said Letters Patent is hereby corrected as shown below:

In column 6 at line 48, please delete " 40 ".

In column 6 at line 49, please delete " circuit " and insert -- circuit 40 --.

In column 11 at line 8, please delete " the " and insert -- the abrupt --.

Signed and Sealed this

Nineteenth Day of August, 1997

*Attest:*

BRUCE LEHMAN

*Attesting Officer*   *Commissioner of Patents and Trademarks*